(12) United States Patent
Mujtaba

(10) Patent No.: US 7,477,633 B2
(45) Date of Patent: Jan. 13, 2009

(54) METHOD AND APPARATUS FOR VARYING THE NUMBER OF PILOT TONES IN A MULTIPLE ANTENNA COMMUNICATION SYSTEM

(75) Inventor: Syed Aon Mujtaba, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 301 days.

(21) Appl. No.: 11/223,775

(22) Filed: Sep. 9, 2005

(65) Prior Publication Data

US 2006/0072529 A1 Apr. 6, 2006

Related U.S. Application Data

(60) Provisional application No. 60/608,472, filed on Sep. 9, 2004.

(51) Int. Cl.
*H04M 3/20* (2006.01)
(52) U.S. Cl. ........................ 370/338; 370/343; 370/203; 370/204; 375/267; 375/260; 375/299; 375/146
(58) Field of Classification Search .................. 375/130, 375/340, 262, 267, 260, 299, 146; 370/338, 370/343, 203, 204, 208, 210
See application file for complete search history.

(56) References Cited

U.S. PATENT DOCUMENTS 7,233,612 B1 * 6/2007 Zhang et al. ................. 375/130

2005/0226142 A1 * 10/2005 Moorti et al. ............... 370/208

OTHER PUBLICATIONS

IEEE Forum paper, "Pilot Tone Based Maximum Likelihood Estimator for Carrier Frequency Offset in OFDM Systems" IEEE Forum paper, "Preamble Structure for MIMO OFDM WLAN Systems Based on IEEE 802.11a", Lei et al, pp. 2046-2050.*

* cited by examiner

*Primary Examiner*—Charles N Appiah
*Assistant Examiner*—Randy Peaches
(74) *Attorney, Agent, or Firm*—Ryan, Mason & Lewis, LLP

(57) ABSTRACT

Methods and apparatus are provided for varying the number of pilot tones in a multiple antenna communication system. Data is transmitted in a multiple antenna communication system by selecting a number of pilot tones to be employed to transmit the data; and transmitting an indication of the selected number of pilot tones in a preamble of a packet containing the data. Data is received in a multiple antenna communication system by receiving a preamble having an indication of a number of pilot tones embedded in the data; and processing the received data based on the indicated number of pilot tones. The indication of the selected number of pilot tones can be transmitted, for example, in a SIGNAL field of an exemplary IEEE 802.11 preamble. The number of pilot tones can be selected, for example, based on one or more of (i) a delay spread of a channel; (ii) the SNR at the receiver; or (iii) a number of antennas at a receiver.

20 Claims, 3 Drawing Sheets

METHOD AND APPARATUS FOR VARYING THE NUMBER OF PILOT TONES IN A MULTIPLE ANTENNA COMMUNICATION SYSTEM

CROSS-REFERENCE TO RELATED APPLICATIONS

The present application claims priority to U.S. Provisional Patent Application Ser. No. 60/608,472, filed Sep. 9, 2004, incorporated by reference herein.

FIELD OF THE INVENTION

The present invention relates generally to multiple antenna wireless communication systems, and more particularly, to phase and frequency offset estimation techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire the channel matrix through training. This is generally achieved by using a specific training symbol, or preamble, to perform synchronization and channel estimation. The preamble helps the receiver (i) estimate the power of the received signal to set an automatic gain control (AGC) function; (ii) acquire the timing offset to perform optimal placement of a Fast Fourier Transform (FFT) window; (iii) estimate the frequency offset between the transmitter and receiver, and correct for the frequency offset prior to FFT demodulation; and (iv) estimate the channel transfer function to help demap the Quadrature Amplitude Modulation (QAM) symbols after the FFT has been performed.

In addition, a number of pilot tones are embedded in the OFDM data symbols to estimate the phase noise and residual frequency offset. Phase noise at the local oscillators of the transmitter and receiver creates a common phase error (CPE) at the FFT output that generally needs to be corrected for every OFDM symbol. Residual frequency offset at the input of the FFT also creates CPE.

In general, the accuracy of the CPE estimation increases with the number of pilots, thereby reducing the packet error rate, and increasing the reliability of the transmission. A greater number of pilots, however, reduces the effective data rate, since actual data is now replaced by pilots (which are known at both the transmitter and the receiver). The number of pilots needed to meet a certain packet error rate (PER) at the receiver is a function of several parameters, such as the delay spread of the channel, the signal to noise ratio (SNR) at the receiver, and the number of antennas at the receiver. If the channel has a low delay spread, then the frequency selectivity of the channel is low as well, and thus a fewer number of pilots are required. On the other hand, a larger number of pilots would be required for a channel exhibiting a larger delay spread. If the SNR at the receiver is low, larger number of pilots are needed to get an accurate estimate of the CPE. Likewise, if there are diversity antennas present at the receiver, and the RF chains are fed from a single LO source, then Maximal Ratio combining (MRC) can be used at the receiver to improve the accuracy of the estimate of the CPE. Thus, the accuracy of the CPE estimate can be improved with diversity antennas and fewer pilots are needed to achieve the same level of performance.

A need therefore exists for methods and apparatus for varying the number of pilot tones in a multiple antenna communication system.

SUMMARY OF THE INVENTION

Generally, methods and apparatus are provided for varying the number of pilot tones in a multiple antenna communication system. According to one aspect of the invention, data is transmitted in a multiple antenna communication system by selecting a number of pilot tones to be employed to transmit the data; and transmitting an indication of the selected number of pilot tones in a preamble of a packet containing the data. The indication of the selected number of pilot tones can be transmitted, for example, in a SIGNAL field of an exemplary IEEE 802.11 preamble. The number of pilot tones can be selected, for example, based on one or more of (i) a delay spread of a channel; (ii) the SNR at the receiver; or (iii) a number of antennas at a receiver.

According to another aspect of the invention, data is received in a multiple antenna communication system by receiving a preamble having an indication of a number of pilot tones embedded in the data; and processing the received data based on the indicated number of pilot tones.

A more complete understanding of the present invention, as well as further features and advantages of the present invention, will be obtained by reference to the following detailed description and drawings.

DETAILED DESCRIPTION

The present invention recognizes that the optimum number of pilots varies with operating parameters. Thus, the present invention provides methods and apparatus for varying the number of pilot tones to help maximize data transfer without compromising link robustness and reliability. In one exemplary implementation discussed below in conjunction with FIG. 3, the number of pilots is signaled to the receiver in the SIGNAL field, or any such field that indicates to the receiver the parameters that are required to successfully decode the payload. For example, other parameters could include data rate, coding rate and modulation level.

Figure 1:
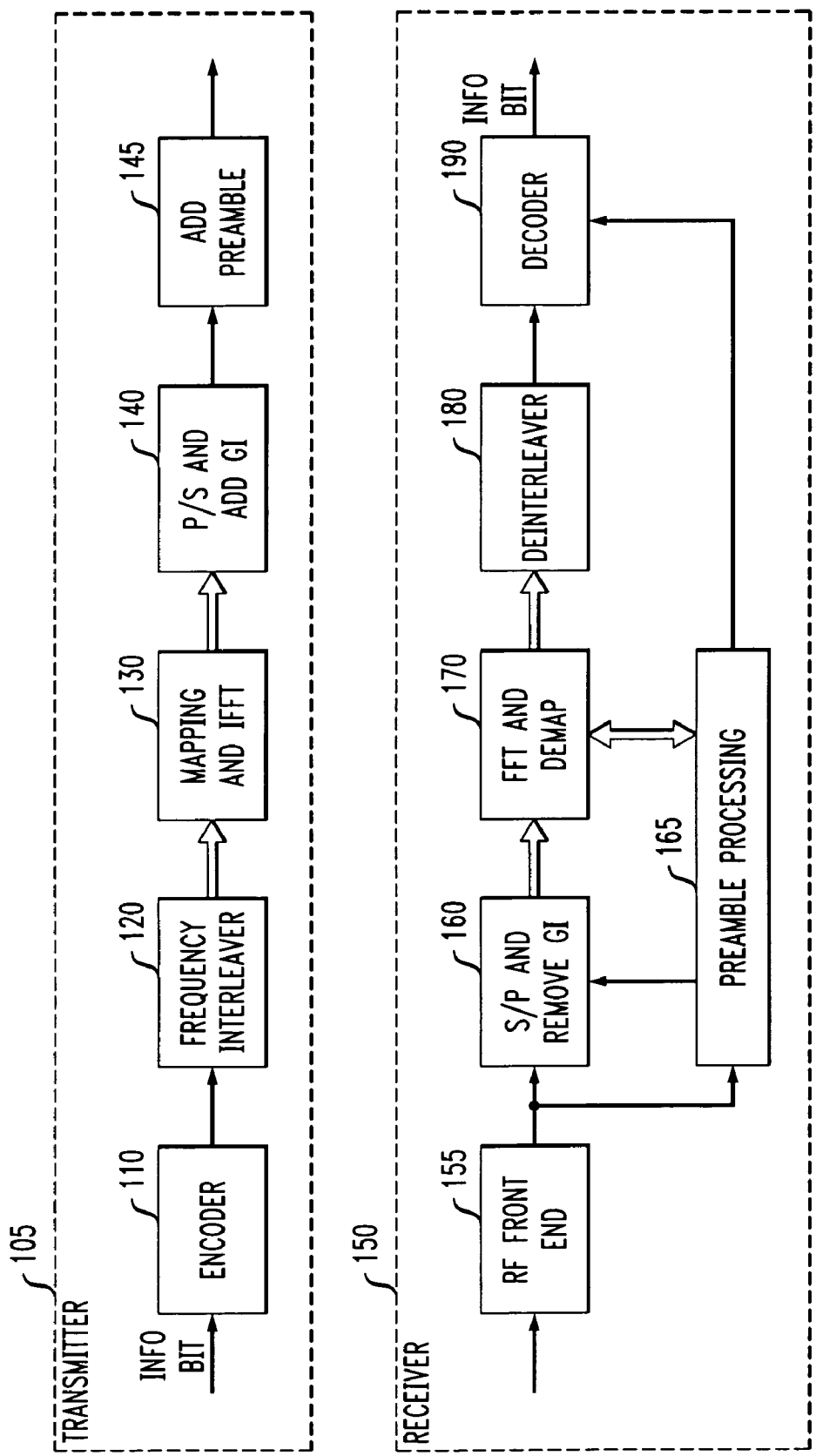
FIG. 1 is a schematic block diagram of a conventional 802.11 a/g transceiver.

FIG. 1 is a schematic block diagram of a conventional 802.11 a/g transceiver 100. At the transmitter side 105, the information bits are first encoded at stage 110 and then frequency interleaved at stage 120. The encoded and interleaved bits are then mapped onto subcarriers (tones) at stage 130 and form a frequency domain OFDM signal. The frequency domain OFDM signal is translated to the time domain by an inverse Fourier transform (IFFT) during stage 130. At stage 140, the data is serialized and a guard interval is added to each OFDM symbol. Finally, a preamble including training and signal fields is added during stage 145 at the beginning of each packet.

At the receiver side 150, the received signal is initially processed by the RF front end 155, and then the serial data is parallelized and the guard interval is removed at stage 160. The time domain signal is translated to the frequency domain using an FFT 170 and the subcarriers are demapped to encoded and interleaved bits. Meanwhile, the preamble is processed at stage 165. The interleaved bits are deinterleaved at stage 180 and decoded at stage 190 to provide the transmitted information bits.

Figure 2:
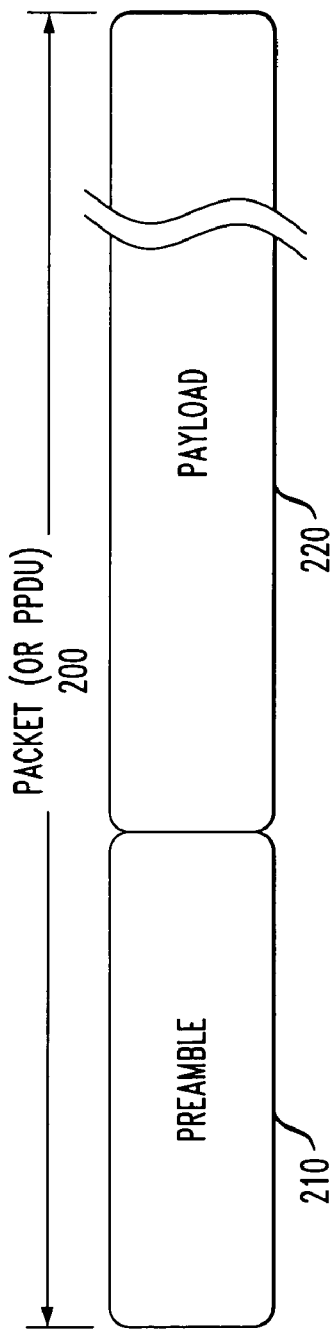
FIG. 2 illustrates a typical packet format for an exemplary IEEE 802.11 or another IP-based OFDM system.

FIG. 2 illustrates a typical packet format 200 for an exemplary IEEE 802.11 or another IP-based OFDM system. As shown in FIG. 2, each packet 200 or PLCP Protocol Data Unit (PPDU) (for wireless LANs) comprises a preamble 210 and a payload 220. Each preamble 210 contains all relevant information needed to decode the payload 220, such as synchronization information and a SIGNAL field. The payload 220 contains data and one or more pilot tones.

Figure 3:
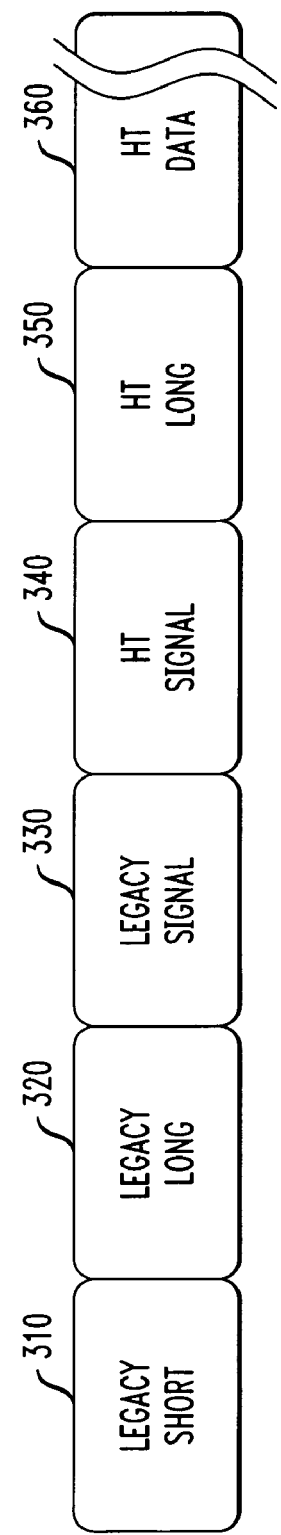
FIG. 3 illustrates an exemplary format of the preamble of FIG. 2 for IEEE 802.11n.

FIG. 3 illustrates an exemplary preamble format 300 for IEEE 802.11n. According to one aspect of the invention, the existing HT Signal field can be used to signal to the receiver the number of pilot tones that were employed. As shown in FIG. 3, the exemplary preamble 300 includes a legacy short training symbol 310, a legacy long training symbol 320, a legacy SIGNAL field 330, a high throughput (HT) SIGNAL field 340, a HT long training symbol 350 and a HT data field (payload) 360. Thus, the HT SIGNAL field 340 can convey to the receiver the number of pilot tones. For example the HT SIGNAL field 340 can be encoded with a value indicating whether two, four, or six pilot tones were employed.

For example, some manufacturers have proposed using four pilot tones in 20 MHz and six pilot tones in 40 MHz. Other manufacturers have proposed using only two pilot tones in 20 MHz and four pilot tones in 40 MHz.

The present invention recognizes that the optimum number of pilots varies with operating parameters. The various criteria used to select the number of pilot tones is application specific and outside the scope of the present invention. In general, the number of pilot tones can be selected, for example, based on the delay spread of the channel, or the SNR at the receiver, or the number of antennas at the receiver (or all of the above). In this manner, the present invention allows the increased accuracy provided by a greater number of pilots to be balanced against the resulting reduction in data rate. As previously indicated, a greater number of pilots increases the accuracy of the CPE estimation, thereby reducing the packet error rate, and increasing the reliability of the transmission. A greater number of pilots, however, reduces the effective data rate, since actual data is now replaced by the pilots (which are known at both the transmitter and the receiver).

From an efficiency perspective, the lowest number of pilots to achieve the desired robustness is desirable. In other words, from an efficiency perspective, data should be transmitted on as many tones as possible. It is noted that the position of the pilots are configured in advance. Thus, only the number of pilot tones, but not their position, need to be signaled to the receiver. The receiver simply selects one of several possible pilot patterns, which indicate the number of pilots and their positions.

The number of pilot tones must be signaled to the receiver, for example, in the SIGNAL field, either explicitly or implicitly. Implicit signaling for instance would be in the case of low modulation order QAM symbols, which typically operate at low SNR. In such a case, whenever a BPSK symbol is received, more pilots would be used, and whenever 64-QAM symbols are used, fewer pilots would be used.

Figure 4:
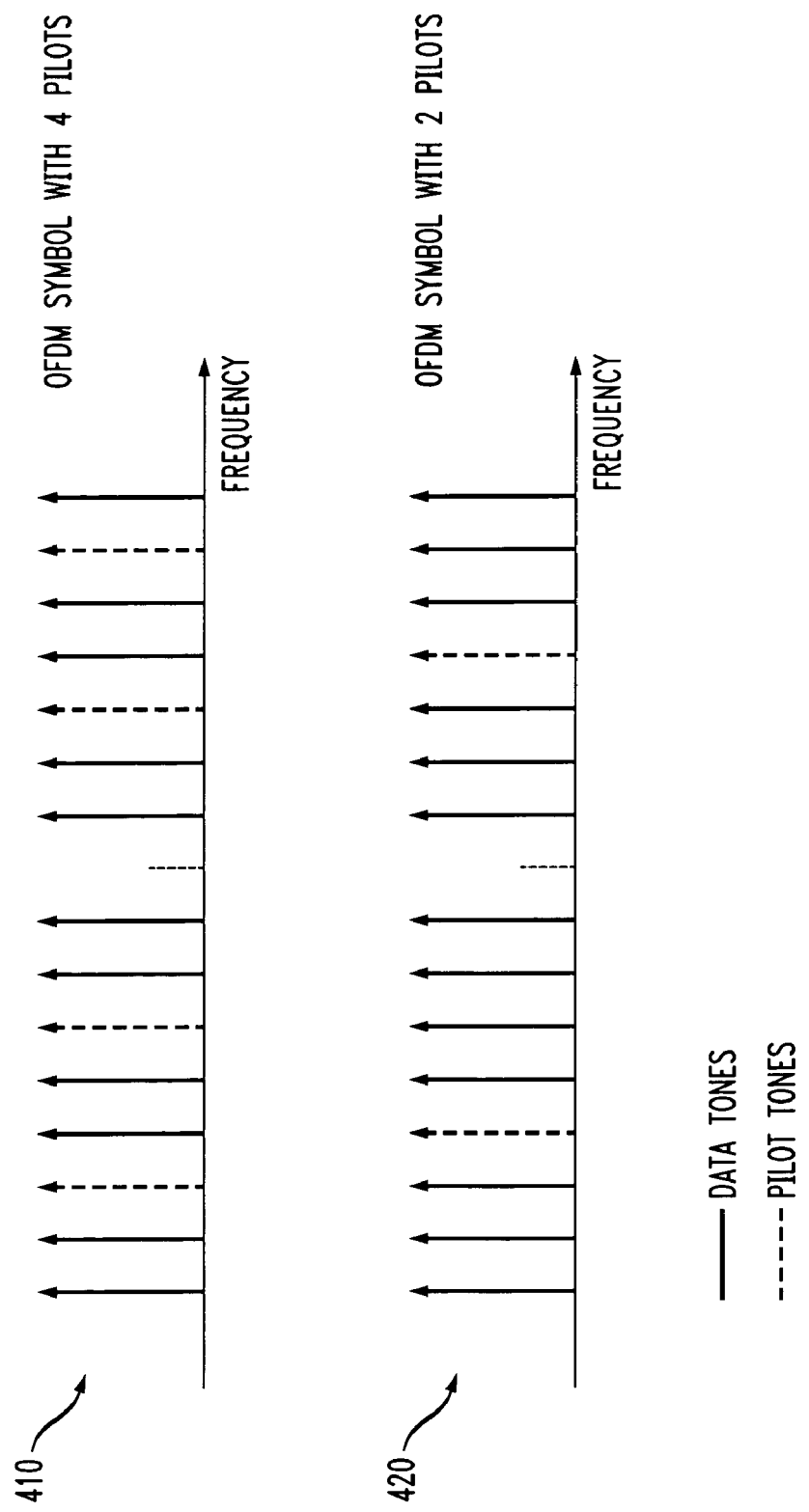
FIG. 4 illustrates an exemplary OFDM symbol with four pilot tones and an exemplary OFDM symbol with two pilot tones.

FIG. 4 illustrates an exemplary OFDM symbol 410 with four pilot tones and an exemplary OFDM symbol 410 with two pilot tones.

It is to be understood that the embodiments and variations shown and described herein are merely illustrative of the principles of this invention and that various modifications may be implemented by those skilled in the art without departing from the scope and spirit of the invention.

I claim:

1. A method for transmitting data in a multiple antenna communication system, said method comprising the step of:
    selecting a number of pilot tones to be employed to transmit said data; and
    transmitting an indication of a quantity of said selected number of pilot tones in a preamble of a packet containing said data.

2. The method of claim 1, wherein said indication of said selected number of pilot tones is transmitted in a SIGNAL field.

3. The method of claim 1, wherein said preamble is an IEEE 802.11 preamble.

4. The method of claim 1, wherein said number of pilot tones is selected based on a delay spread of a channel.

5. The method of claim 1, wherein said number of pilot tones is selected based on the SNR at the receiver.

6. The method of claim 1, wherein said number of pilot tones is selected based on a number of antennas at a receiver.

7. A transmitter in a multiple antenna communication system, comprising:
    a memory; and
    at least one processor, coupled to the memory, operative to:
    select a number of pilot tones to be employed to transmit said data: and
    transmit an indication of a quantity of said selected number of pilot tones in a preamble of a packet containing said data.

8. The transmitter of claim 7, wherein said indication of said selected number of pilot tones is transmitted in a SIGNAL field.

9. The transmitter of claim 7, wherein said preamble is an IEEE 802.11 preamble.

10. The transmitter of claim 7, wherein said processor is further configured to select said number of pilot tones based on a delay spread of a channel.

11. The transmitter of claim 7, wherein said processor is further configured to select said number of pilot tones based on the SNR at the receiver.

12. The transmitter of claim 7 wherein said processor is further configured to select said number of pilot tones based on a number of antennas at a receiver.

13. A method for receiving data in a multiple antenna communication system, said method comprising the steps of:
    receiving a preamble having an indication of a quantity of pilot tones embedded in said data; and
    processing said received data based on said indicated number of pilot tones.

14. The method of claim 13, wherein said indication of said selected number of pilot tones is transmitted in a SIGNAL field.

15. The method of claim 13, wherein said preamble is an IEEE 802.11 preamble.

16. The method of claim 13, wherein said number of pilot tones is selected based on one or more of (i) a delay spread of a channel: (ii) the SNR at the receiver; or (iii) a number of antennas at a receiver.

17. A receiver in a multiple antenna communication system, comprising:
   at least one receiver antenna for receiving a preamble having an indication of a quantity of pilot tones embedded in said data; and
   means for processing said received data based on said indicated number of pilot tones.

18. The receiver of claim 17, wherein said indication of said number of pilot tones is transmitted in a SIGNAL field.

19. The receiver of claim 17, wherein said preamble is an IEEE 802.11 preamble.

20. The receiver of claim 17, wherein said number of pilot tones is selected based on one or more of (i) a delay spread of a channel; (ii) the SNR at the receiver; or (iii) a number of antennas at said receiver.

* * * * *